United States Patent [19]

Lu

[11] Patent Number: 5,574,638
[45] Date of Patent: Nov. 12, 1996

[54] METHOD OF OPTIMAL SCALING OF VARIABLES IN A MULTIVARIABLE PREDICTIVE CONTROLLER UTILIZING RANGE CONTROL

[76] Inventor: Zhuxin J. Lu, 19513 N. 73rd La., Glendale, Ariz. 85308

[21] Appl. No.: 415,882

[22] Filed: Apr. 3, 1995

[51] Int. Cl.$^6$ ............................................ G05B 13/02
[52] U.S. Cl. .................... 364/165; 364/153; 364/157
[58] Field of Search .................... 364/148–157, 364/164, 165, 176; 318/561

[56] References Cited

U.S. PATENT DOCUMENTS

| | | | |
|---|---|---|---|
| 5,347,446 | 9/1994 | Iino et al. | 364/153 |
| 5,351,184 | 9/1994 | Lu et al. | 364/165 |

*Primary Examiner*—Roy N. Envall, Jr.
*Assistant Examiner*—Steven R. Garland
*Attorney, Agent, or Firm*—Arthur A. Sapelli

[57] ABSTRACT

A process control system which includes at least one manipulated variable and at least one controlled variable, provides a method for robust control of a process. Predetermined constraints of the manipulated variables and the controlled variables, and the present values of the manipulated variables are obtained. A set of scale factors for the manipulated variables and the process variables are calculated. The controller is initialized with the set of scale factors, the scale factors determining the relative importance of the manipulated variables and the process variables to the process. New values are calculated for the controlled variables for a predetermined number of points in the future, such that the values of the controlled variables are within the predetermined range thereby obtaining an optimal robustness of the resultant controller. The manipulated variables are also calculated to be within predetermined constraints, and the controlled variables to fall within a predetermined range when controllable. From a plurality of solutions, a most robust solution is selected. Then the manipulated variables are adjusted to cause the process control system to drive the values of the controlled variables to the calculated values.

4 Claims, 2 Drawing Sheets

METHOD OF OPTIMAL SCALING OF VARIABLES IN A MULTIVARIABLE PREDICTIVE CONTROLLER UTILIZING RANGE CONTROL

BACKGROUND OF THE INVENTION

The present invention relates to control systems, and more particularly, to a method of determining the weight of the controlled and manipulated variables of a robust multivariable predictive controller (RMPC) utilizing range control.

In current systems, the controller (RMPC) has no idea of the importance of the controlled variables and manipulated variables, thus requiring the operator (or engineer) to "tell" the controller which is the most important variable, the second most important variable, . . . or if the variables are of equal importance. The user inputs the importance (or weight) of the variables as part of the initialization procedure of a robust multivariable predictive controller. The importance of the controlled variables (cv) or manipulated variables (mv) is a function of several factors, including the units utilized for the cvs and mvs. Engineers currently account for the units for the cvs and mvs and attach an importance to the high-low weights of the cvs and mvs.

Assume for example there are three controlled variables, cv1, cv2, and cv3, where cv1 is a temperature, cv2 is a pressure, and cv3 is a concentration variable of the process, all of course in different engineering units. In this instance one controlled variable can be more important to the controller than another controlled variable. If the pressure is in small engineering units (PSI) which can have a range up to 25,000 PSI, each unit of pressure change may not be as important as 1° of temperature change for the process. If the pressure, however, is in atmospheres, then one atmosphere change in pressure may be more significant then 1° of temperature change.

In the present invention, there is provided an optimal solution for an RMPC in the off-line that will determine in a relative sense how important each cv and mv is to the process. Thus, the operator does not have to be concerned with making the determination. The user can still override or fine-tune the solution output (i.e., the weight for the individual variables can be made more or less), however, the present invention provides the user with an excellent starting point for initializing the controller.

Thus by attaching a weight to the variables of the process, the impact to the system is reduced and results in a more robust controller.

SUMMARY OF THE INVENTION

Therefore, there is provided by the present invention a method of determining the weight of the controlled and manipulated variables of a robust multivariable predictive controller utilizing range control. There is provided by the present invention, a controller which controls each controlled variable of a process to be within a corresponding predetermined range. A process control system includes at least one manipulated variable and at least one controlled variable. A method which provides robust control of a process, comprises the steps of calculating a set of scale factors for the manipulated variables and the process variables. The controller is initialized with the set of scale factors, the scale factors determining the relative importance to the process of the manipulated variables and the process variables. The robust control is initialized to have predetermined constraints of the manipulated variables and the controlled variables. The present values of the manipulated variables and the controlled variables are then obtained. New values are calculated for the controlled variables for a predetermined number of points in the future, such that the values of the controlled variables are within the predetermined range thereby obtaining an optimal robustness of the resultant controller. The manipulated variables are also calculated to be within predetermined constraints, and the controlled variables to fall within a predetermined range when controllable; otherwise, to keep the controlled variable constraint violations to a minimum. From a plurality of solutions, a most robust solution is selected. Then the manipulated variables are adjusted to cause the process control system to drive the values of the controlled variables to the calculated values.

Accordingly, it is an object of the present invention to provide a method for determining the weight of the controlled and manipulated variable of a robust multivariable predictive controller utilizing range control.

This and other objects of the present invention will become more apparent when taken in conjunction with the following description and attached drawings, wherein like characters indicate like parts, and which drawings form a part of the present application.

DETAILED DESCRIPTION

In a robust multivarible predictive controller (RMPC) utilizing range control of the present invention, there is devised an optimal solution in an off-line mode that will determine in the relative sense how important each controlled variable (cv) and each manipulated variable (my) is for the process. A detailed description of the RMPC utilizing range control can be had by reference to U.S. Pat. No. 5,351,184, assigned to the same assignee as the present application, and is incorporated by reference herein to the extent necessary for an understanding of the present invention.

Figure 1:
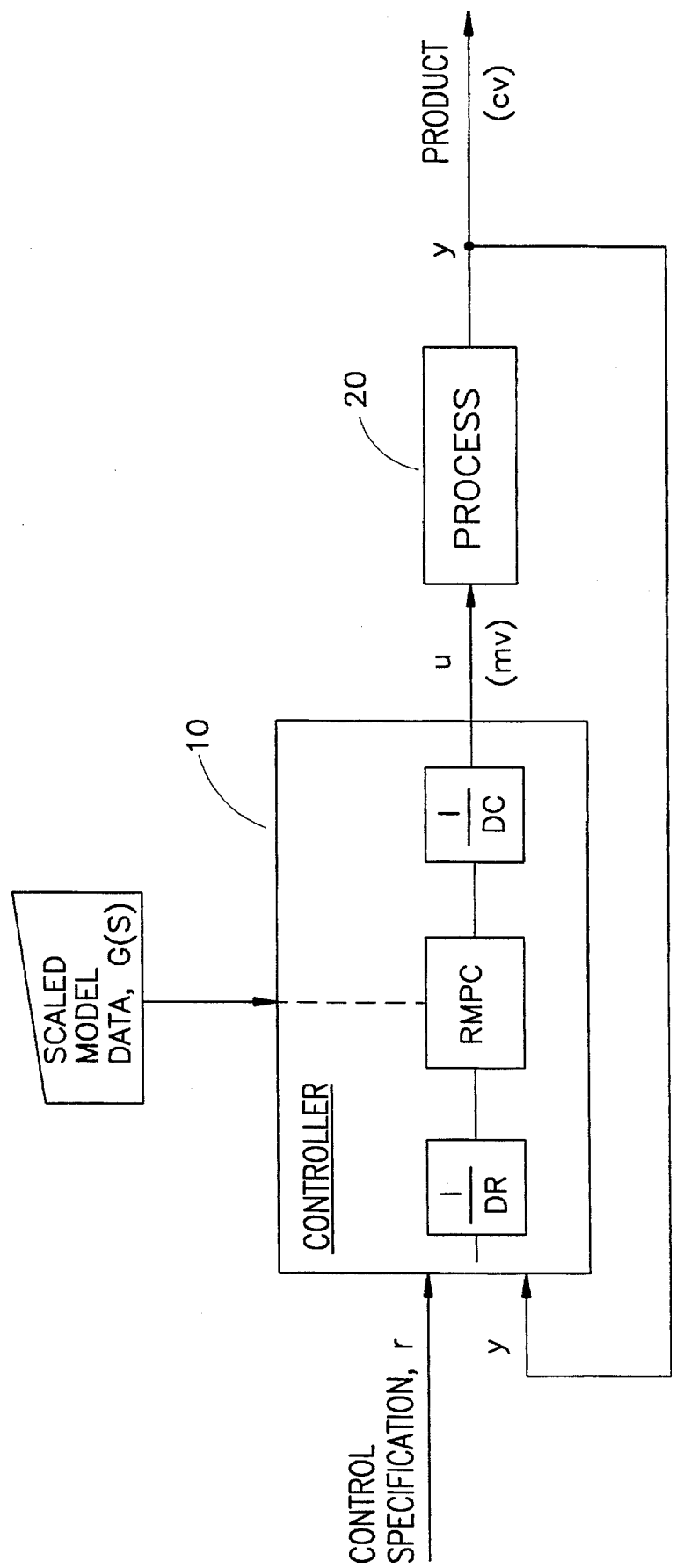
FIG. 1 shows a functional block diagram of the process control system in which the present invention may be utilized.

Referring to FIG. 1, there is shown a functional block diagram of a process control system in which the present invention may be utilized. A controller 10 has multiple outputs, which are coupled as input variables u to a process 20. The process 20 can include, for example, a plurality of elements which can be controlled such as valves, heaters, . . . . Process variables y of process 20 include temperature, pressure, concentration, . . . which govern product quality. The input variables u (or manipulated variables my), are defined as:

$$mv = \begin{pmatrix} mv_1 \\ mv_2 \\ mv_3 \end{pmatrix}$$

and the output variables y (process variables pn or controlled variables cv), are defined as:

$$cv = \begin{pmatrix} cv_1 \\ cv_2 \\ cv_3 \end{pmatrix}$$

Thus, in this example, the process 20 is a dynamic process P(s) having three (3) manipulated variables and three (3) controlled variables.

The process 20 is defined by G, where G (original model matrix) is:

$$G = \begin{pmatrix} g_{11}, & g_{12}, & g_{13} \\ g_{21}, & g_{22}, & g_{23} \\ g_{31}, & g_{32}, & g_{33} \end{pmatrix}$$

Thus, if $cv_1$ is pressure, $cv_2$ is temperature and $cv_3$ is concentration carrying forth the example mentioned previously, (pressure) $cv_1 = g_{11} \cdot mv_1 + g_{12} \cdot mv_2 + g_{13} \cdot mv_3$ (temperature) $cv_2 = g_{21} \cdot mv_1 + g_{22} \cdot mv_2 + g_{23} \cdot mv_3$ (concentration) $cv_3 = g_{31} \cdot mv_1 + g_{32} \cdot mv_2 + g_{33} \cdot mv_3$ As can be seen, pressure is affected by the three respective mvs ($mv_1$, $mv_2$, $mv_3$), . . . .

The values of $g_{11}$, $g_{12}$, $g_{13}$, . . . will vary as a function of the engineering units (or more simply units) selected for the controlled variables.

If $cv_2$ is a linear measure in inches, and if for example purposes $g_{21}$, $g_{22}$, and $g_{23}$ are 10, 12, 24, respectively, then:

$cv_2(inch) = 10 \cdot mv_1 + 12 \cdot mv_2 24 \cdot mv_3$ such that for every one unit (i.e., one inch) $mv_1$ changes $cv_2$ changes 10 inches, for every inch that $mv_2$ changes $cv_2$ changes 12 inches, and for every inch that $mv_3$ changes $cv_2$ changes 24 inches. If the units are in feet rather than inches then $g_{21}$, $g_{22}$ and $g_{23}$ are changed to 0.8, 1.0, and 2.0, respectively. But, the significance of $cv_2$ has increased because for every unit change in $cv_2$ corresponds to a one infect rather than inches change in $cv_2$. Thus in the overall control process it is undesirable to have $cv_2$ deviating from the set point by one unit, as compared to when $cv_2$ was expressed in inches.

Since the controller is not sensitized to units, the controller will try to correct a cv having a higher deviation from its desired position first. Thus, for example, if $cv_x$ has a deviation of 2 and $cv_y$ has a deviation of 1 from their respective desired positions, the controller will try to move $cv_x$ to its desired position first since it has a higher number; the controller has no knowledge of units. However, a 2 unit deviation in $cv_x$ can be less significant than a 1 unit deviation in $cv_y$. (For example, if $cv_x$ is in millimeters and $cv_y$ is in feet, $cv_x$ is 2 millimeters apart versus $cv_y$ which is 1 foot apart. In this case $cv_y$ should be the parameter of concern.) Thus, there must exist a higher cv weight on $cv_y$. Similarly, the selection of units for mv must also be determined. The present invention determines a scaling factor which includes the units of cvs and mvs.

The method of finding "scaling factors" in accordance with the method of the present invention will now be described. A diagonal matrix is defined such that:

$$G(s) = \begin{bmatrix} DR_1 & 0 & 0 \\ 0 & DR_2 & 0 \\ 0 & 0 & DR_3 \end{bmatrix} \begin{bmatrix} g_{11} & g_{12} & g_{13} \\ g_{21} & g_{22} & g_{23} \\ g_{31} & g_{32} & g_{33} \end{bmatrix} \begin{bmatrix} DC_1 & & 0 \\ & \cdot & \\ & & \cdot \\ 0 & & DC_3 \end{bmatrix}$$

(Row Scaling)      (Column Scaling)

DR determines the importance of each cv, and DC determines the importance of each mv. Then (using matrix algebra operations well known to those skilled in the art:

$$G(s) = \begin{bmatrix} DR_1 \cdot g_{11} \cdot DC_1 & DR_1 \cdot g_{12} \cdot DC_2 & DR_1 \cdot g_{13} \cdot DC_3 \\ DR_2 \cdot g_{21} \cdot DC_1 & DR_2 \cdot g_{22} \cdot DC_2 & DR_2 \cdot g_{23} \cdot DC_3 \\ DR_3 \cdot g_{31} \cdot DC_1 & DR_3 \cdot g_{32} \cdot DC_2 & DR_3 \cdot g_{33} \cdot DC_3 \end{bmatrix}$$

(Scaled)

Next, find a pre scale factor (row scale factor) and a post scale factor (column scale factor) such that the condition number of the resulting matrix [G(s) scaled matrix ] is minimized. The minimized condition number always gives optimal importance selecting (i.e., optimal scaling or optimal weighting).

Figure 2:
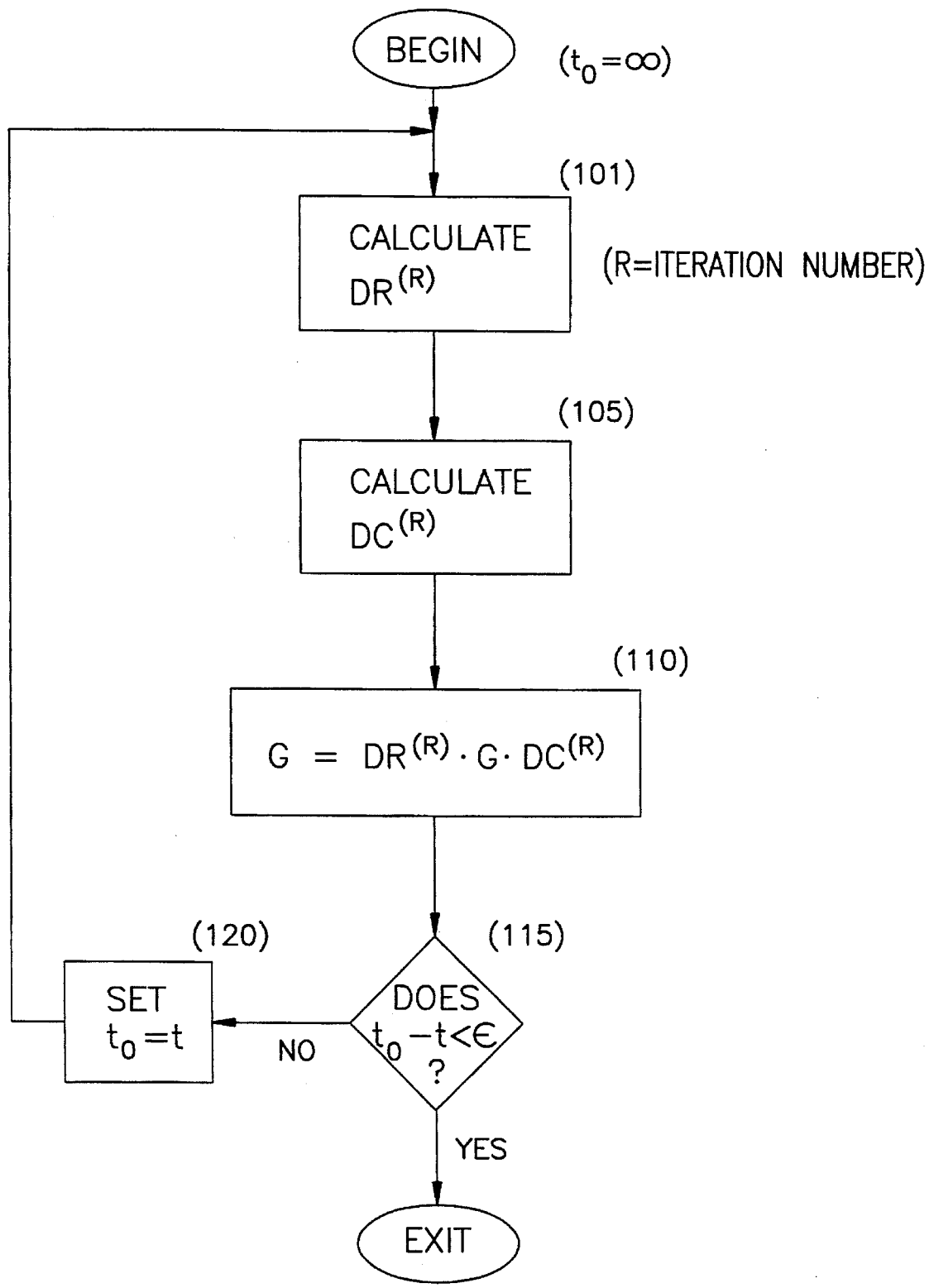
FIG. 2 shows a flow diagram of determining a minimum condition number of the resulting diagonal matrix.

The optimal scaling factors, DR and DC, are determined in accordance with the flow diagram of FIG. 2. In order to find a minimum condition number an iterative process is performed.

The process starts with $t_0 = \infty$ (where $t_o$ = condition number of (G) = cond(G)) where G is:

$$G = \begin{bmatrix} g_{ll} & \cdots & g_{lm} \\ \cdot & & \\ \cdot & & \\ \cdot & & \\ g_{nl} & & g_{nm} \end{bmatrix}$$

DR is calculated (block 101) where:

$$DR = \begin{bmatrix} DR_1 & & \\ & \cdot & \\ & & \cdot \\ & & & DR_n \end{bmatrix}$$

$$DR_1 = \left( \sqrt{\sum_{j=1}^{m} g_{1j}^2} \right)^{-1}$$

$$DR_i = \left( \sqrt{\sum_{j=1}^{m} g_{ij}^2} \right)^{-1} \quad \text{for } i = 1 \text{ to } n$$

DC is then calculated (block 105) where:

$$DC = \begin{bmatrix} DC_1 & & \\ & \cdot & \\ & & \cdot \\ & & & DC_m \end{bmatrix}$$

$$DC_1 = \left( \sqrt{\sum_{i=1}^{n} g_{i1}^2} \right)^{-1}$$

$$DC_i = \left( \sqrt{\sum_{j=1}^{n} g_{ij}^2} \right)^{-1} \text{ for } i = 1 \text{ to } m$$

The values of DR and DC are saved for each iteration. Cond (G) is calculated (block 110) where:

$$G = (DR)^r \cdot G \cdot (DC)^r$$

The condition number of G is checked against the condition number of G of the previous iteration (block 115), and if it is less than a predetermined number, the process exits. If the difference is greater than the predetermined number $\epsilon$, (tolerance level), the process repeats at block 101, and the condition number of the iteration just completed is saved (block 120). Note that the first time through the loop, the answer to block 115 is always NO. In a typical case, the number of iterations is about ten (10).

At the $r^{th}$ iteration, when the process is exited $$DR = DR^{(1)} \cdot DR^{(2)} \cdot \ldots DR^{(r)}.$$

$$DC = DC^{(1)} \cdot DC^{(2)} \cdot \ldots DC^{(r)}.$$

and $$G(s) = DR \cdot G \cdot DC$$

The solutions obtained above off-line are then applied to the controller, and specifically to the RMPC controller of the predetermined embodiment. The scaled model data is loaded in the RMPC controller (i.e., G(s)). G(s) is essentially a new gain matrix with different cv units and mv units. Also loaded are the pre and post scale factors determined above, yielding a controller 10 configuration as shown in FIG. 1.

Although the above has been described in conjunction with the RMPC, it will be understood by those skilled in the art the technique of optimal scaling can be applied to any process controller.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

I claim:

1. In a process control system having a controller for providing robust control to a process, the process further having at least one manipulated variable and at least one process variable, a method for providing the robust control of a process, comprising the steps of:

a) calculating a set of scale factors for the manipulated variables and the process variables;

b) initializing the controller with the set of scale factors, the set of scale factors determining a relative importance to the process of the manipulated variables and the process variables;

c) initializing the robust control to have predetermined constraints of the manipulated variables and the controlled variables;

d) obtaining present values of the manipulated variables and the process variables said process variables corresponding to measurement parameters of the process;

e) calculating new values of the process variables for a predetermined number of points in the future in order to have the values of the process variables within the predetermined range to obtain an optimal robustness of the resultant controller, the manipulated variables being within predetermined constraints, and the process variables falling within a predetermined range when controllable; otherwise, keeping process variable constraint violations to a minimum;

f) from a plurality of solutions, selecting a most robust solution; and g) controlling the process in accordance with the most robust solution.

2. A method according to claim 1 wherein the step of calculating a set of scale factors includes the steps of:

a) defining a diagonal matrix including row scaling matrix, a gain matrix of the controller, and a column scaling matrix;

b) from the row scaling matrix, determining a pre scaling factor;

c) from the column scaling matrix, determining a post scaling factor;

d) from the pre scaling factor and the post scaling factor, determining a condition number;

e) determining if the condition number is less than a predetermined tolerance level;

f) if the condition number is greater than the predetermined tolerance level, repeating step (b) thru step (e), otherwise continuing;

g) calculating the set of scale factors from the pre scale factors and the post scale factors calculated from each iteration for loading into the controller.

3. In a process control system, a method for providing robust control of a process according to claim 2, wherein the step of controlling comprises the steps of:

a) outputting the manipulated variables of the most robust solution of step (f) of claim 1 to the process; and b) adjusting the process in response to the manipulated variables to cause the process control system to drive the values of the process variables to the calculated values of step (f) of claim 1, thereby providing the control of the process.

4. In a process control system, a method for providing robust control of a process according to claim 3, wherein the step of selecting comprises the step of:

a) determining a set of controlled variables which correspond to minimum controller magnitude.

\* \* \* \* \*